United States Patent Office 3,118,160
Patented Jan. 21, 1964

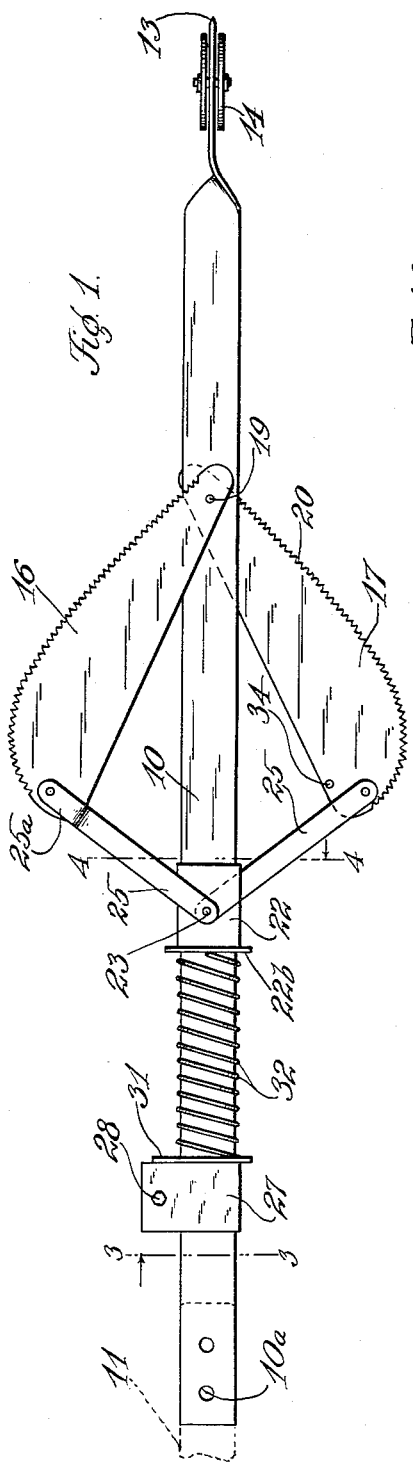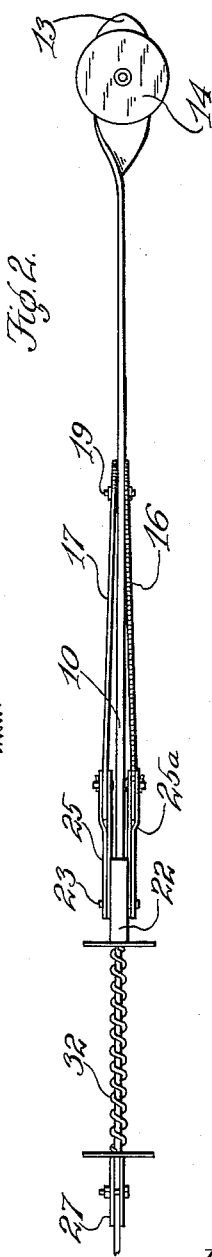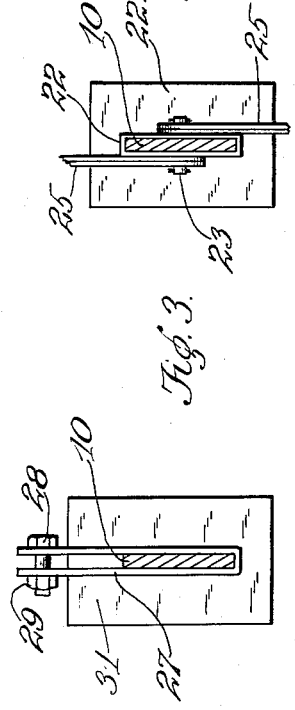

3,118,160
CLEANING IMPLEMENTS FOR DRAIN PIPES
AND SEWERS
Joseph C. Maxia, Chicago, Ill.; Marie Maxia, executrix of
said Joseph C. Maxia, deceased
Filed July 2, 1962, Ser. No. 206,649
1 Claim. (Cl. 15—104.19)

My invention relates to implements insertible in drain pipes, sewers and the like for dislodging and clearing away roots, hardened deposits and other material which has accumulated therein or clings to the walls thereof to the extent of impairing circulation or drainage. Implements for this purpose are usually carried at the leading end of a long rod, and have projections designed to loosen and break up the clinging accumulations and create a wide passage for the free flow of the drain pipe or sewer contents. Implements used heretofore have been more or less crude and made poor progress in dislodging obstructions which block or impair circulation, the reason for this being that the accumulated material was too hard to break up by the poking or prying action of the implement. Progress was therefore difficult and slow, and the efficiency of the implement poor.

In view of the above situation, it is one object of the present invention to provide an implement for the purpose specified which works on the principle of a saw to break up and clear away hardened or snagged material which blocks the passage in the pipe or sewer or clings to the walls thereof.

A further object is to construct the improvement with a pair of blades having rounded saw edges which negotiate jagged or projecting accumulations gradually, yet cut deeply as the implement is operated, so that rapid headway is made in clearing the interior of the pipe or sewer of obstructions and material clining to the walls thereof.

Another object is to mount the saw blades of the implement yieldably, whereby to contract where the space in the pipe or sewer is narrow, yet enable the operation of the blades to be continued with sawing action to widen the narrow passage.

A still further object is to set the blades in planes quite close to the flat strip forming the shank of the implement, so that the blades will accommodate themselves to the lateral flexing of the rod in pipes which are bent or curved.

An important object is to construct the implement along sturdy lines and in compact form.

A better understanding of the invention may be gained by reference to the accompanying drawing, in which—

FIG. 1 is a side elevation of the implement;
FIG. 2 is a top plan view; and
FIGS. 3 and 4 are, respectively, enlarged sections on the lines 3—3 and 4—4 of FIG. 1.

Referring specifically to the drawing, 10 denotes a strip of flat steel which serves as the shank of the present implement. Usually, an implement of this type is carried at the front end of a long flat rod; and FIG. 1 shows that the rear end portion of the shank 10 is made with holes 10a for the application of bolts (not shown) to secure the implement to a rod 11.

Since the front end of the implement is used for probing into and advancing through narrow passages in clogged areas, such end is more or less pointed, as indicated at 13; and it carries side wheels 14 for facility of progress in narrow passages. However, the main portion of the shank carries saw blades which function to enlarge the passages and clear away obstructions therein.

The saw blades 16 and 17 are of hardened steel and of a design tapering from the rear toward the front; and the blades apply to the shank 10 from opposite sides, converging into crossed relation in front, where they are pivoted to a cross-pin 19 passing through the shank. The outer edges of the blades are prominently rounded toward the rear and formed with saw-teeth 20.

A tubular slide 22 is carried by the shank 10 behind the blades 16 and 17; and trunnions 23 project from opposite sides of the slide. A pair of links 25 are directed from the rear portions of the blades to the correspondingly-positioned trunnions 23, whereby to pivot such rear portions to the slide. As noted in FIG. 2, the links are of two-ply strip material, with outer end portions spaced to form pockets 25a for the rear end portions of the blades. The slide has its rear end enlarged with a plate 22b.

A U-clamp 27 is mounted on the shank 10 at some distance behind the slide 22, the clamp being secured by a cross-bolt 28 directed from one side to receive a nut 29 on the other side. The clamp carries a plate 31 on its front side, such plate being similar to the plate 22b of the slide 22. A compression spring 32 is mounted on the shank 10 between the plates referred to. The coils of the spring are flat for purposes of compactness, but the spring may be of the conventional round-coil type if desired.

The clamp 27 is set at a point along the shank 10 where the blades 16 and 17 will have an approximately 60-degree spread. When the implement is inserted into a pipe in which accumulations leave only a narrow passage, probing into the latter with the blades 16 and 17 will force them to gather as they enter the passage. This action will induce the slide to back against the spring 32 and compress the same. The implement is now operated in the manner of a saw; and it follows that the pressure of the spring will dilate the blades as accumulations are cleared away and progressively enlarge the passage in the pipe. The rounded outermost portions of the blades will make this operation gradual, reducing the effort necessary to operate the implement or extricate it when the blades are caught in snagged roots. Persistence in advancing the implement may push the links 25 beyond dead center and collapse the blades. To avoid this, one of the blades is equipped with a stud 34 in the advancing path of the related link, to serve as a stop for the same before dead center.

It will now be apparent that the novel implement is an assembly of sturdy construction and compact design. However, the shank 10—being of flat strip stock—is flexible to a degree permitting it to follow a bend, curve or offset in a pipe or sewer. The close grouping of the blades and links, and the inherent flexibility of the same permits the blade assembly to conform to the flexing of the shank in the deviating zones of progress without resistance or binding action, so that the implement may operate efficiently whether its path is straight or with lateral deviations. Further, the implement is complete as a unit, and adaptable to any long rod by simple attachment. Finally, the implement is composed of few parts and devoid of complications.

While I have described the invention along specific lines, various minor changes or refinements may be made therein without departing from its principle, and I reserve the right to employ all such changes and refinements as may fall within the scope and spirit of the appended claim.

I claim:

A cleaning implement for drain pipes and the like comprising an elongated shank of flat strip material adapted to be advanced into the pipe with a leading end, a pair of blades pivoted to opposite sides of the shank near said end and spread in rearward direction, the outer edges of the blades being saw-toothed and prominently rounded toward the rear, and means rearwardly of the blades resisting gathering motion by the same, said means comprising a slide operable on the shank, links pivotally attached to the slide and the rear end portions of the blades, a clamp slidable on the shank and spaced rearwardly from the slide, a spring coiled on the shank between the slide and the clamp, adjusting means to set the clamp at different points along the shank for changing the tension of the spring, the slide, spring and clamp being narrow for encasing the shank closely, and plates carried by the contiguous ends of the slide and clamp and forming end-limits for the spring.

References Cited in the file of this patent

UNITED STATES PATENTS

| | | |
|---|---|---|
| 442,320 | Ingalls | Dec. 9, 1890 |
| 1,026,525 | McKeel et al. | May 14, 1912 |
| 1,312,404 | Kiarmann | Aug. 5, 1919 |
| 1,315,849 | McDonald | Sept. 9, 1919 |

FOREIGN PATENTS

| | | |
|---|---|---|
| 9,857 | Great Britain of 1913 | June 11, 1912 |
| 54,277 | Switzerland | Oct. 27, 1910 |

OTHER REFERENCES

Germany (printed application) K24,557 XII/47f, Nov. 15, 1956.